(12) United States Patent
Lee et al.

(10) Patent No.: US 9,521,064 B2
(45) Date of Patent: Dec. 13, 2016

(54) COOPERATIVE CACHING METHOD AND APPARATUS FOR MOBILE COMMUNICATION SYSTEM

(71) Applicants: Samsung Electronics Co., Ltd., Gyeonggi-do (KR); Research and Business Foundation, Korea University, Seoul (KR)

(72) Inventors: Chulki Lee, Seoul (KR); Sangheon Pack, Seoul (KR); Janghee Lee, Gyeonggi-do (KR); Sangjun Moon, Seoul (KR); Yongseok Park, Seoul (KR)

(73) Assignees: Samsung Electronics Co., Ltd. (KR); Research and Business Foundation, Korea University (KR)

( * ) Notice: Subject to any disclaimer, the term of this patent is extended or adjusted under 35 U.S.C. 154(b) by 405 days.

(21) Appl. No.: 13/753,948

(22) Filed: Jan. 30, 2013

(65) Prior Publication Data

US 2013/0198330 A1    Aug. 1, 2013

(30) Foreign Application Priority Data

Jan. 30, 2012  (KR) .......................... 10-2012-0008983

(51) Int. Cl.
*G06F 12/084* (2016.01)
*G06F 12/0868* (2016.01)
(Continued)

(52) U.S. Cl.
CPC ........... *H04L 45/00* (2013.01); *H04L 67/2842* (2013.01); *H04W 4/18* (2013.01)

(58) Field of Classification Search
CPC ........ H04W 88/08; H04W 40/20; H04W 4/12; H04W 8/04; H04W 8/08; H04W 4/18; H04W 72/0426; H04L 67/2842; H04L 12/5855; H04L 51/38; G06F 17/30902
(Continued)

(56) References Cited

U.S. PATENT DOCUMENTS 5,864,854 A * 1/1999 Boyle
6,862,606 B1 * 3/2005 Major ..................... H04L 29/06
                                                 709/203
(Continued)

OTHER PUBLICATIONS

Amrik, tewarir, sanghyum, srp, circa 2000-2002, IBM Thomas J. Watson Research Center; On Space management in a dynamic edge data cache.*
(Continued)

*Primary Examiner* — Sargon Nano
(74) *Attorney, Agent, or Firm* — The Farrell Law Firm, P.C.

(57) ABSTRACT

A cooperative caching method and apparatus for reducing data access time and data acquisition cost in a mobile communication system are provided. The cooperative caching method of a local base station in a mobile communication system using caches of base stations cooperatively connected with each other includes determining, when a request for data is received from a client, whether the data is stored in the cache of the local base station; sending, to a home base station, upon determining that the data is not stored in the cache, a request for the data; acquiring the data from one of the home base station and a server according to whether the data is stored in the home base station; and serving the data to the client.

10 Claims, 8 Drawing Sheets

(51) Int. Cl.
*H04L 12/701* (2013.01)
*H04L 29/08* (2006.01)
*H04W 4/18* (2009.01)

(58) Field of Classification Search
USPC .................................................... 709/217
See application file for complete search history.

(56) References Cited

U.S. PATENT DOCUMENTS

| | | | | |
|---|---|---|---|---|
| 6,973,546 B2* | 12/2005 | Johnson | ............ | G06F 17/30902 707/E17.01 |
| 7,096,249 B2* | 8/2006 | Rajic | ............ | G06F 9/54 709/201 |
| 7,120,757 B2* | 10/2006 | Tsuge | ............ | G06F 3/0605 707/E17.01 |
| 7,823,156 B2* | 10/2010 | Soules | ............ | G06F 3/0613 709/219 |
| 8,055,845 B2* | 11/2011 | Soules | ............ | G06F 12/0862 709/223 |
| 8,108,620 B2* | 1/2012 | Anderson | ............ | G06F 12/0813 711/130 |
| 8,422,495 B2* | 4/2013 | Wing et al. | ............ | 370/389 |
| 8,656,125 B2* | 2/2014 | Binzinger | ............ | G06F 11/2094 707/634 |
| 8,762,477 B2* | 6/2014 | Xie | ............ | H04L 67/327 709/213 |
| 8,782,323 B2* | 7/2014 | Glikson | ............ | G06F 12/0813 711/6 |
| 8,874,095 B2* | 10/2014 | Anthony, Jr. | ............ | H04L 67/2842 370/229 |
| 8,954,446 B2* | 2/2015 | Vijayan Retnamma | ............ | G06F 11/1453 707/659 |
| 9,020,900 B2* | 4/2015 | Vijayan Retnamma | ............ | G06F 17/30312 707/652 |
| 9,239,687 B2* | 1/2016 | Vijayan | ............ | G06F 11/1453 |
| 9,286,293 B2* | 3/2016 | Jolly | ............ | G06F 17/30 |
| 9,405,763 B2* | 8/2016 | Prahlad | ............ | G06F 11/1453 |
| 9,456,054 B2* | 9/2016 | Jacobson | ............ | G06F 15/173 |
| 2001/0056500 A1* | 12/2001 | Farber | ............ | G06F 9/505 709/245 |
| 2002/0007392 A1* | 1/2002 | Buddhikot | ............ | H04N 7/165 709/203 |
| 2002/0099850 A1* | 7/2002 | Farber | ............ | G06F 9/505 709/245 |
| 2008/0209053 A1* | 8/2008 | Shen | ............ | H04L 29/06 709/228 |
| 2008/0215755 A1* | 9/2008 | Farber | ............ | G06F 9/505 709/245 |
| 2010/0057883 A1* | 3/2010 | Cao et al. | ............ | 709/218 |
| 2013/0042971 A2* | 2/2013 | Ganz | ............ | B29C 65/46 156/272.2 |
| 2014/0358859 A1* | 12/2014 | Nemoto | ............ | G06F 17/30153 707/636 |

OTHER PUBLICATIONS

On the benefit of cooperative Proxy Caching for Peer-to-Peer Traffic. IEE transactions of Parallel and distributed systems. vol. 21, Jul. 201. By Mohamed Hefeeda and Behrooz Noorizadeh.*
Hefeeda, Mohamed et al., On the Benefits of Cooperative Proxy Caching for Peer-to-Peer Traffic, IEEE Transactions on Parallel and Distributed Systems, vol. 21, No. 7, p. 998-1010, IEEE Computer Society.

* cited by examiner

COOPERATIVE CACHING METHOD AND APPARATUS FOR MOBILE COMMUNICATION SYSTEM

PRIORITY

This application claims priority under 35 U.S.C. §119(a) to Korean Application Serial No. 10-2012-0008983, which was filed in the Korean Intellectual Property Office on Jan. 30, 2012, the entire content of which is hereby incorporated by reference.

BACKGROUND OF THE INVENTION

1. Field of the Invention

The present invention relates generally to a mobile communication system and, more particularly, to a method and apparatus of cooperative caching among base stations of the mobile communication system.

2. Description of the Related Art

Mobile communication systems have been developed to provide mobile subscribers with voice communication services. With the rapid advance of mobile communication technologies, mobile communication systems have evolved to support high-speed data communication services as well as standard voice communication services. Meanwhile, limited resources and user requirements for higher data rates in current mobile communication systems spur evolution to even more advanced mobile communication systems.

Web caching is one of the main techniques for improving the performance of a world wide web-based communication system. Web caching temporarily stores web documents such as Hypertext Markup Language (HTML) pages or images for later retrieval, in response to a request for the same documents, so as to reduce the bandwidth usage and load concentrated on the server.

However, conventional web caching methods have a drawback in that the data, even it is frequently used, must be retrieved from other caches. If the requests are concentrated on a cache having data that is frequently accessed, the increased traffic in the cluster is likely to cause a bottleneck effect on a corresponding link to a specific base station.

Therefore, there is a need for a more efficient cooperative caching method in a mobile communication system.

SUMMARY OF THE INVENTION

The present invention has been made in an effort to address the above-described problems and provide at least the advantages described below. An aspect of the present invention provides a cooperative caching method and apparatus that is capable of reducing the outbound traffic amount and data access time by configuring the base stations with cache memories and clustering the base stations connected through broadband links in the mobile communication system.

In accordance with an aspect of the present invention, a cooperative caching method of a local base station in a mobile communication system using caches of base stations cooperatively connected with each other is provided. The method includes determining, when a request for data is received from a client, whether the data is stored in the cache of the local base station; sending, to a home base station, upon determining that the data is not stored in the cache, a request for the data; acquiring the data from one of the home base station and a server according to whether the data is stored in the home base station; and serving the data to the client.

In accordance with another aspect of the present invention, a cooperative caching method of a home base station designated for storing a certain data in a mobile communication system using caches of base stations cooperatively connected with each other is provided. The method includes determining, when a request for a data is received from a local base station, whether the data is stored in the home base station; transmitting, when the data is stored in the home base station, the data to the local base station; and determining, when the data is not stored in the home base station, whether to trigger cooperation with other base stations for retrieving the data according to whether a space for storing the data exists in the home base station.

In accordance with another aspect of the present invention, a local base station for performing cooperative caching in a mobile communication system using caches of base stations cooperatively connected with each other is provided. The local base station includes an interface unit for communicating with at least one node connected to the local base station; a storage unit that includes a cache including a local part for storing data to be served to clients connected to the local base station and a cooperative part for storing data predetermined to be stored in the local base station and provided to the nodes; and a control unit for determining, when a request for a data is received from a client, whether the data is stored in the cache of the local base station, requesting, upon determining that the data is not stored in the cache, a home base station for the data, acquiring the data from one of the home base station and a server according to whether the data is stored in the home base station, and serving the data to the client.

In accordance with still another aspect of the present invention, a home base station for performing cooperative caching in a mobile communication system using caches of base stations cooperatively connected with each other is provided. The home base station includes an interface unit for communicating with at least one node connected to the home base station; a storage unit that includes a cache including a local part for storing data to be served to clients connected to the home base station and a cooperative part for storing data predetermined to be stored in the home base station and provided to the nodes; and a control unit which controls determining, a request for a data is received from a local base station, whether the data is stored, transmitting, upon determining that the data is stored in the home base station, the data to the local base station, and determining, upon determining that the data is not stored in the home base station, whether to trigger cooperation with other base station to retrieve the data according to whether a space for storing the data exists.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE PRESENT INVENTION

Figure 1:
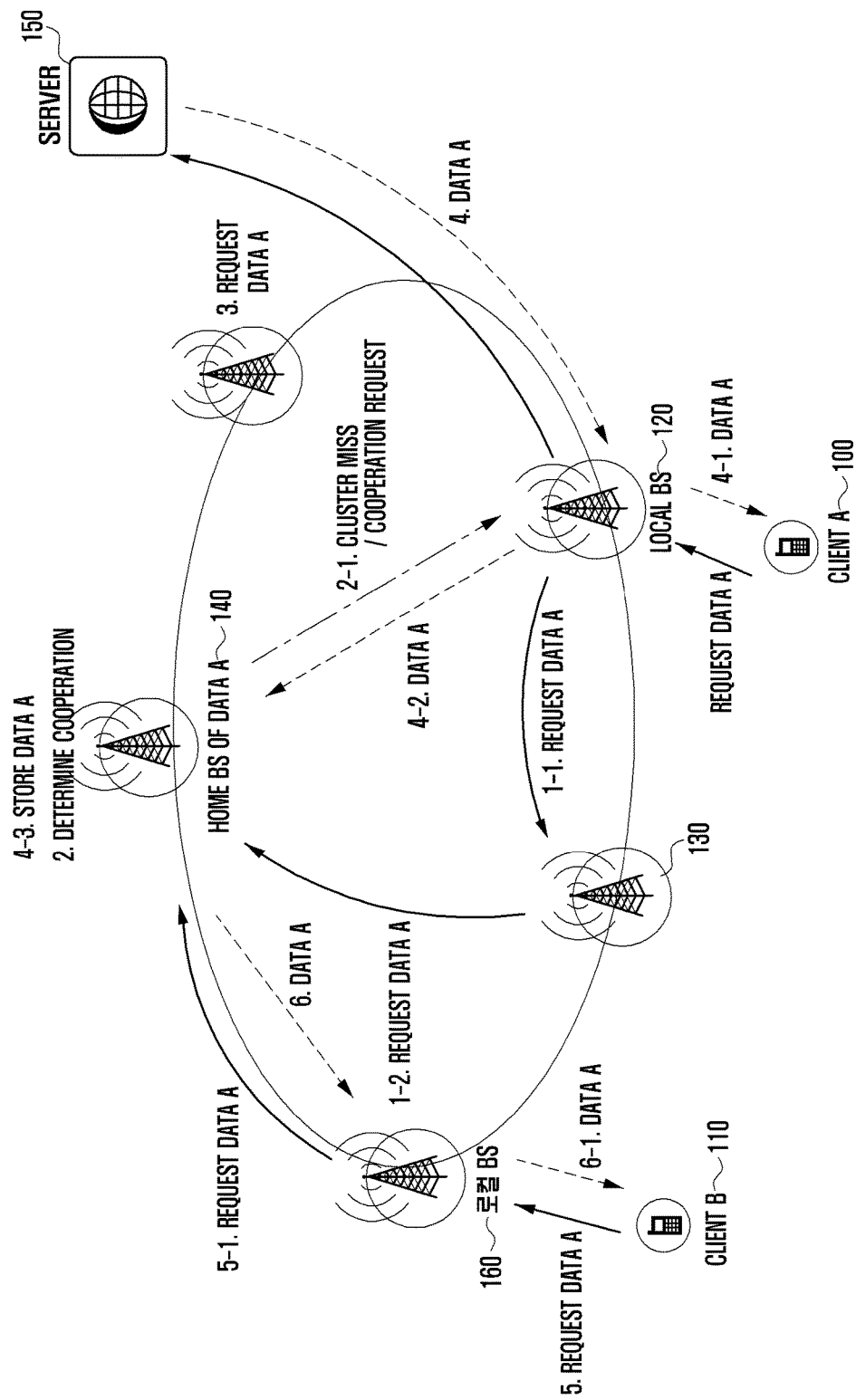
FIG. 1 is a diagram illustrating a general operating procedure of cooperative caching among base stations according to an embodiment of the present invention.

Embodiments of the present invention are described as follows with reference to the accompanying drawings in detail. The same or similar reference numbers may be used throughout the drawings to refer to the same or similar parts. Detailed descriptions of well-known functions and structures incorporated herein may be omitted to avoid obscuring the subject matter of the present invention.

As described above, web caching is a technique used for improving world wide web-based systems. Web caching is capable of reducing the bandwidth usage and the traffic concentration on the server due to the manner of temporarily storing the web documents, such as HTML pages and images in a cache for later retrieval, in response to a request for the same documents.

In the web caching, when a Uniform Resource Locator (URL) is requested in a web browser, a HyperText Transfer Protocol (HTTP) session is established to the corresponding address (i.e. the server), such that when using a proxy cache, the client is connected to the proxy cache in the HTTP session, and thus the URL request is delivered to the proxy cache. The proxy cache is positioned at a gateway to the Internet and, if a request for a webpage which is cached is received, the proxy cache provides the client with the requested webpage in a Local Area Network (LAN) boundary having a broad bandwidth, instead of the server outside the LAN, resulting in reduction of response time to the client and use of expensive Wide Area Network (WAN) bandwidth. Since the probability of visiting a certain website increases in proportion to the number of users, the web cache becomes more effective as the number of clients increases.

With cooperation among caches, the cache hit rate increases in comparison to the hit rate from using caches independently, resulting in improvement of performance. Since the base stations of a mobile communication network are connected through broadband cables, if the base stations are equipped with caches and clustered for cooperative caching, this arrangement is expected to reduce the outbound traffic and data access time.

A Distributed Hash Table (DHT) is efficient to a large-scale application that provides an extendable lookup function. The load distribution characteristic of a DHT makes it possible to distribute the traffic concentrated on a specific area to other base stations in the cluster. Meanwhile, the lookup cost, which increases logarithmically in accordance with a number of the nodes included in the network, facilitates extension of the network. Also, since a DHT operates in distributed manner, the DHT improves network stability. Chord, which is a representative algorithm for DHT, uses a hash function such as Secure Hash Algorithm (SHA)–1 to assign keys to the nodes and data. Once a key is assigned, the data corresponding to the key is mapped to one of the nodes included in the network. The lookup is performed through message exchange among the nodes and, if a key is given, it is possible to discover the corresponding node easily using a routing table referred to as a finger table.

A method for using an entire cluster as one cache without redundantly storing data among the caches in the cluster has been proposed in "On the Benefits of Cooperative Proxy Caching for Peer-to-Peer Traffic" (M. Hefeeda et al, IEEE Transactions on Parallel and Distributed Systems vol. 21, no. 7, July, 2010).

However, this method has a drawback in that, although the data is used frequently, the data must be retrieved from other neighbor caches. If requests are concentrated on the data having high popularity, the traffic increases in the cluster so as to increase the probability of a bottleneck effect at a specific base station.

In order to address this problem, embodiments of the present invention include a method for dividing cache into a cooperative part for cooperation with other base station in the cluster and a local part for the client that are allowed for data redundancy to reduce the access time and traffic concentrated on a specific cache in the cluster.

As described above, embodiments of the present invention reduce the outbound traffic amount and data access time by configuring a cluster of the base stations equipped with respective caches and connected among each other through broadband links.

In order for the caches to cooperate with each other in the cluster, there is a need of a method to effectively discover a base station having a specific data from among the base stations in the cluster. For this purpose, a method according to an embodiment of the present invention configures a virtual overlay network operating independently over the physical network of the base station included in the cluster using a Distributed Hash Table (DHT). Using a DHT, the base stations are capable of operating in distributed manner and each base station is designated for storing specific data, thereby enabling efficient retrieval of the data. With a load-balancing characteristic, the traffic concentration on a specific area is effectively reduced.

In the following description, the base station storing the data according to the DHT technique according to embodiment of the present invention is referred to as a Home Base station (HomeBS), and the base station to which a client has connected is referred to as Local Base station (LocalBS). Each base station can simultaneously operate as a HomeBS and a LocalBS.

According to an embodiment of the present invention, the cache of each base station is divided into a cooperative part and a local part. The cooperative part is the storage part responsible for caching specific data while operating as the HomeBS, and the data stored in the cooperative part is used in cooperation among the base station in the cluster. The local part is the storage part, used while operating as the LocalBS, for caching the data requested by the client.

FIG. 1 is a diagram illustrating a general operating procedure of cooperative caching among base stations according to an embodiment of the present invention.

Referring to FIG. 1, client A 100 connects to a local BS 120 through a radio channel. If the client A 100 sends a request to the local BS 120 for data A at step 1, the local BS 120 checks whether the local BS 120 has the requested data A. If the local BS 120 does not have the data A, the local BS 120 checks whether the neighbor BS 130 or the home BS 140 of the data A has the data A.

For this purpose, the local BS 120 is capable of sending a request to the neighbor BS 130 to check whether the neighbor BS 130 stores the data A, at step 1-1. If the neighbor BS 130 does not have the data A too, the local BS 120 requests the home BS of the data A for the data A, at step 1-2.

If the home BS 140 has the data A, the home BS 140 sends the data A to the local BS 120. Otherwise, if the home BS 140 does not have the data A, the home BS 140 sends a request to the local BS 120 for cooperation, at step 2-1. The cooperation request is to request the local BS 120, when the local BS 120 acquires the corresponding data, to transmit the acquired data to the home BS 140.

If the cooperation request is received form the home BS 140, the local BS 120 requests the server 150, which stores the data A, to transmit the data A, at step 3. Upon receiving the request for the data A, the server 150 transmits the data A to the local BS 120.

The local BS 120 stores the data A in the local part of its cache and transmits the data A to the client A 100 at step 4-1. The local BS 120 also transmits the data A to the home BS 140 (which has requested for cooperation for acquisition of data A) at step 4-2.

If the client B 110 has sent a request to the local BS 160 for the data A at step 5, and if the local BS 160 does not have the data A, the local BS 160 sends a request to the home BS 140 for the data A, at step 5-1. Upon receiving the request, the home BS transmits the data A to the local BS 160 at step 6.

According to an embodiment of the present invention, an Expected Saving Value (ESV) is defined per data for efficient cooperative caching. The ESV is defined as gain expected through cooperation for acquiring the corresponding data.

In the web caching, one significant issue is a cache replacement strategy. Cache replacement is a process for deleting, when the cache is full, old data from the cache to secure the space for new data.

Some representative cache replacement policies include the Least Recently Used (LRU) policy and the Least Frequently Used (LFU) policy. The LRU is a policy that discards the least recently requested data first based upon the assumption that the data requested frequently in a short duration is likely to be requested soon again. The LFU is a policy that discards the least frequently requested data based upon the assumption that the popularity of the data is determined based on the number of time the data is requested. In addition to these two policies, there are various cache replacement policies.

According to an embodiment of the present invention, different cache replacement policies are adopted to the two cache parts (cooperative part and local part). When the cooperative part of the cache is full, the data having the least ESV is discarded such that the gain increases when the data stored for use in cooperation is used. Meanwhile, the local part of the cache operates with LRU algorithm such that the recently requested data has priority.

The cache replacement policy according to an embodiment of the present invention is described in further detail later herein.

Data search according to an embodiment of the present invention is performed in the order of the cache of the local base station of the client, the cache of the home base station of the requested data, and the Internet server. A data search procedure according to an embodiment of the present invention is described hereinafter in more detail with reference to FIGS. 2 to 4.

Figure 2:
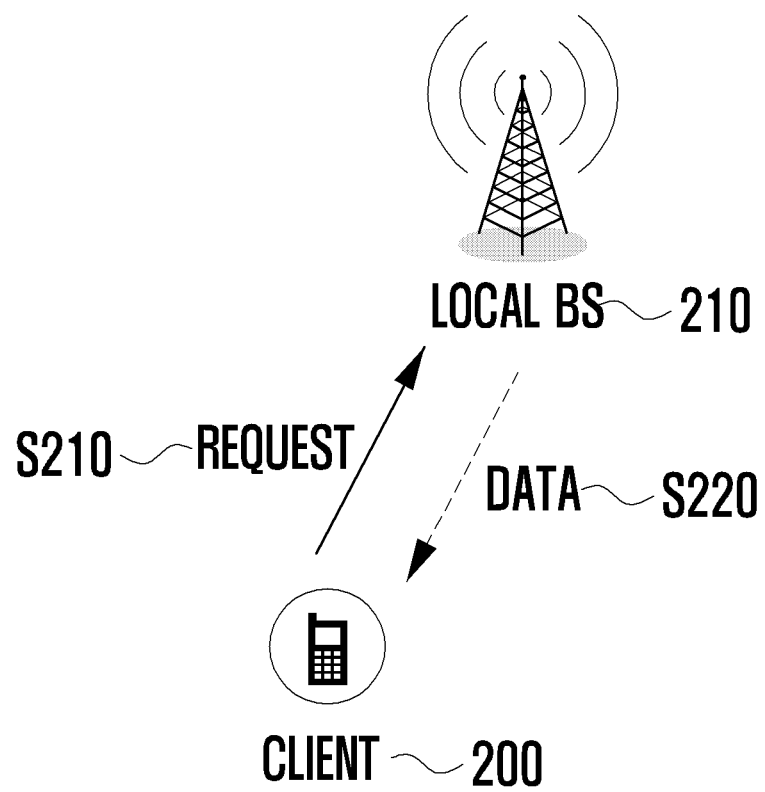
FIG. 2 is a diagram illustrating a data search procedure when data requested by a client is stored in a local base station according to an embodiment of the present invention.

FIG. 2 is a diagram illustrating a data search procedure used when the data requested by a client is stored in the local base station according to an embodiment of the present invention.

Referring to FIG. 2, a client 200 sends a request to a local BS 210 (connected to the client 200) for a certain data at step S210. Upon receiving the request, the local BS 210 checks whether the requested data is stored in its cache. If the data is stored in the cache of the local BS 210 (i.e., a local hit), the local BS 210 immediately transmits the corresponding data to the client 200, at step S210.

Figure 3:
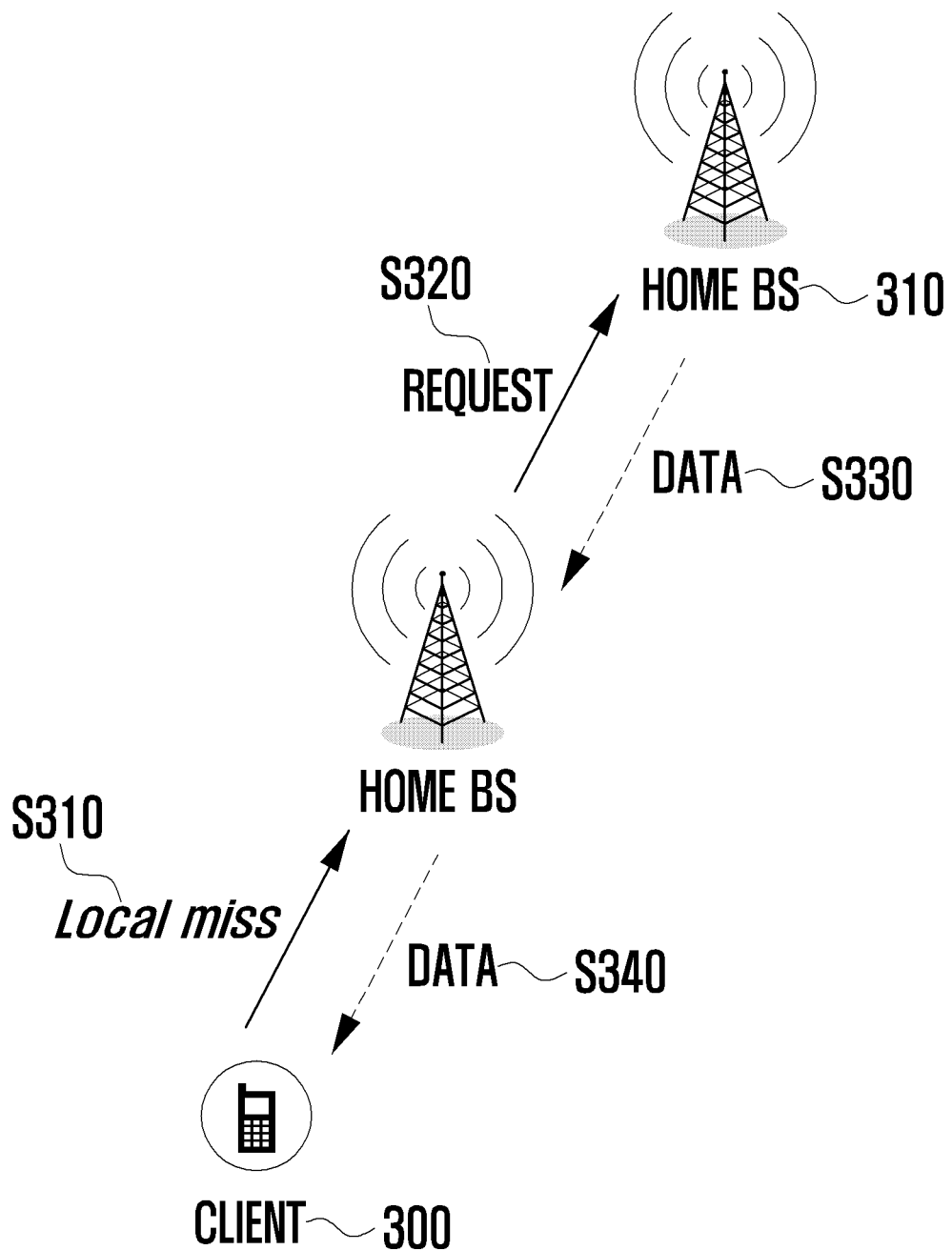
FIG. 3 is a diagram illustrating a data search procedure when data requested by a client is not stored in a local base station according to an embodiment of the present invention.

FIG. 3 is a diagram illustrating a data search procedure used when the data requested by a client is not stored in a local base station according to an embodiment of the present invention.

Referring to FIG. 3, a client 300 sends a request to a local BS 310 (connected to the client 300) for certain data, at step S310. Upon receiving the request, the local BS checks whether the requested data is stored in its cache. If the data is not stored in the cache of the local BS (i.e., a local miss), the local BS sends a request to the home BS 310 (of the requested data) for the data, at step S320.

If the requested data is stored in the cache of the home BS 310 (i.e., a cluster hit), the local BS receives the requested data from the home BS 310, at step S330. Next, the local BS stores the received data in the local part of its cache according to LRU policy and transmits the data to the client 300, at step S340.

Figure 4:
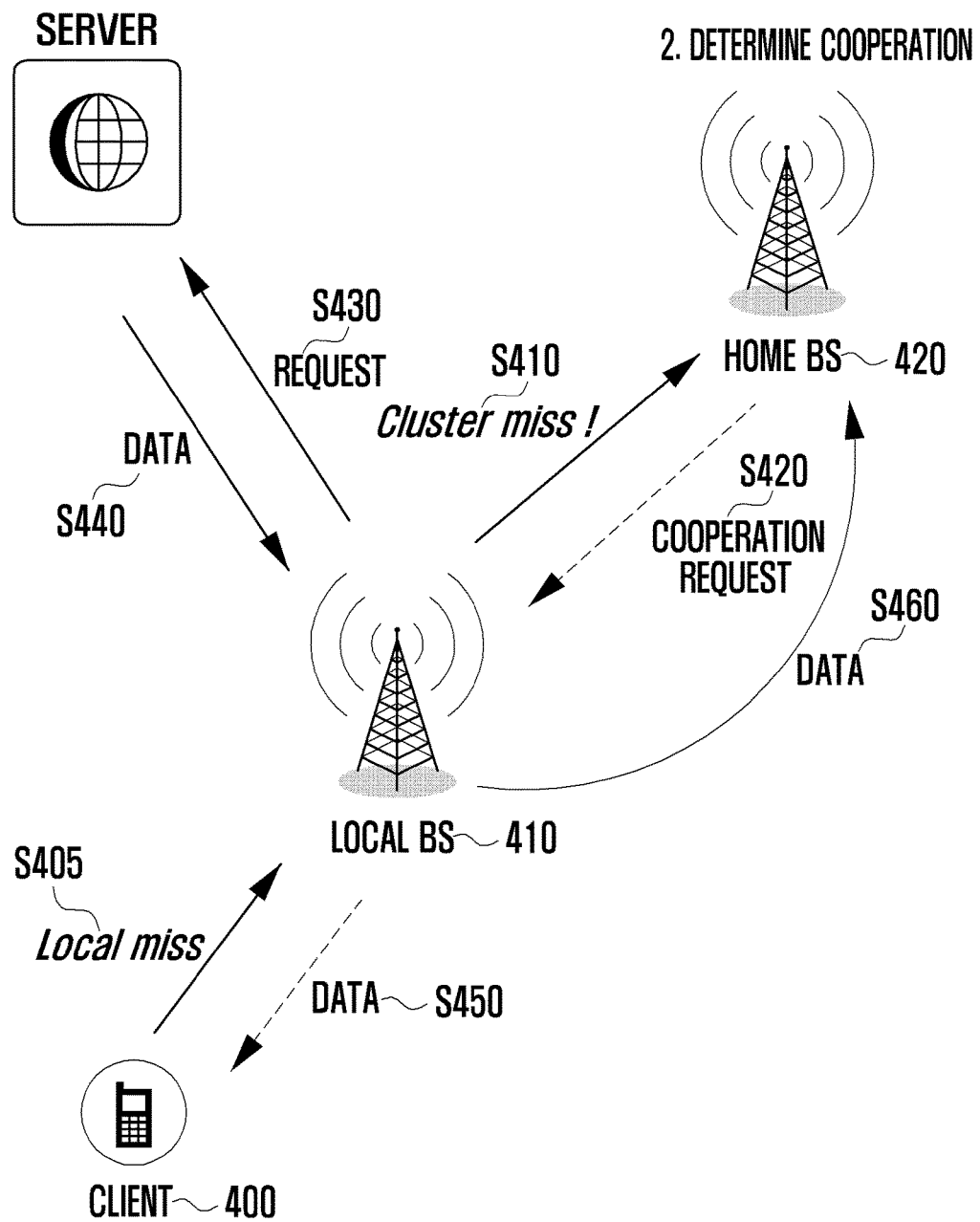
FIG. 4 is a diagram illustrating a data search procedure when data requested by a client is not stored in the local and home base stations according to an embodiment of the present invention.

FIG. 4 is a diagram illustrating a data search procedure used when the data requested by a client is not stored in local and home base stations according to an embodiment of the present invention.

Referring to FIG. 4, a client 400 sends a request to a local BS 410 (connected to the client 400) for a certain data, at step S405. Upon receiving the request, the local BS 410 checks whether the requested data is stored in its cache. If the data is not stored in the cache of the local BS 410 (i.e., a local miss), the local BS 410 sends a request to the home BS 420 (of the corresponding data) for the requested data, at step S410.

If the requested data is not stored in the cache of the home BS 420 (i.e., a cluster miss), the home BS 420 sends a request to the local BS 410 for cooperation, at step S420. The cooperation request is used, when the local BS 410 acquires the corresponding data, to transmit the acquired data to the home BS 420.

If the cooperation request is received, the local BS 410 sends a request to the server located in an external Internet Protocol (IP) network for the corresponding data, at step S430. The local BS 410 stores the data received from the server at step S440 and transmits the data to the client 400 (server hit), at step S450.

The local BS 410 also transmits the data to the home BS 420, at step S460. The home BS 420 stores the data for use in cooperation according to the residual size of the cache and ESV of the data.

Figure 5:
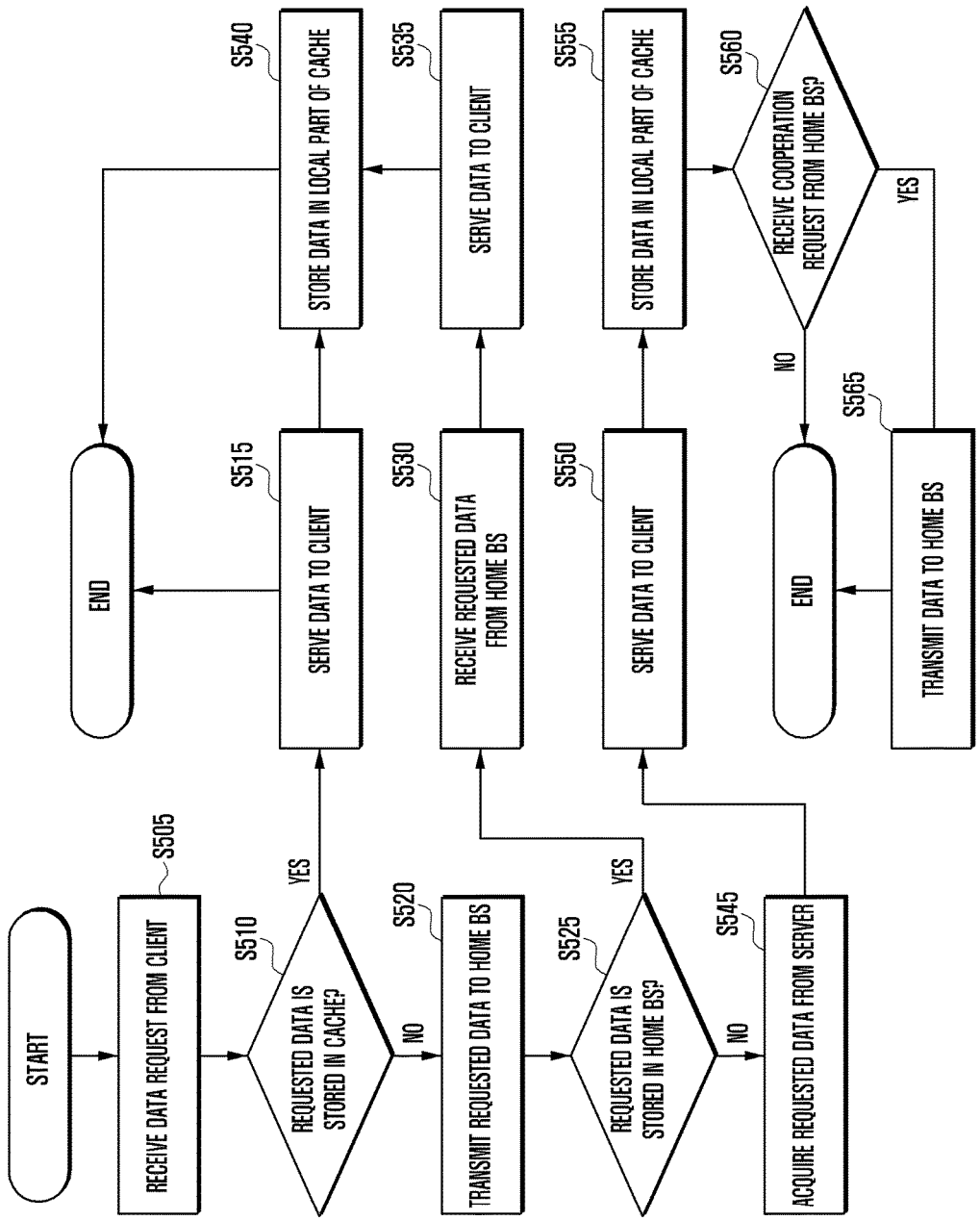
FIG. 5 is a flowchart illustrating the operating procedure of a local base station in the cooperative caching method according to an embodiment of the present invention.

FIG. 5 is a flowchart illustrating an operating procedure of a local base station in a cooperative caching method according to an embodiment of the present invention.

Referring to FIG. 5, a local base station first receives a request for certain data from a client connected to the local base station, at step S505. Upon receiving the request, the local base station determines whether the data requested by the client is stored in its cache (particularly, local cache), at step 510. If the requested data is stored in the cache of the local base station, the local base station serves the data to the client, at step S515.

Otherwise, if the requested data is not stored in the cache of the local base station, the local base station checks the home base station of the requested data. Since each data is mapped to a corresponding home base station in the cluster system using DHT, each base station can be the home base station of certain data.

After checking the home base station of the requested data, the location base station sends a request to the home base station for the data, at step S520.

Upon determining that the home base station has the requested data at step S525, the procedure goes to step S530. At step S530, the local base station receives the requested data from the home base station. Next, the local base station serves the requested data to the client at step S535 and stores the requested data in the local part of its cache at step S540. According to an embodiment of the present invention, the local base station is capable of storing the requested data with the priority assignment for the most recently requested data instead of discarding the oldest data according to LRU algorithm.

Otherwise, upon determining that the home base station does not have the requested data at step S525, the local base station receives a cluster miss message and/or a cooperation request message from the home base station. In this case, the local base station accesses the service located on an external IP network (Internet) to acquire the requested data.

Next, the local base station serves the requested data to the client, at step S550. The local base station also stores the requested data in the local part of its cache, at step S555. According to an embodiment of the present invention, the local base station is capable of storing the requested data with the priority assignment for the most recently requested data instead of discarding the oldest data according to LRU algorithm.

Next, the local base station determines whether the local base station has received a cooperation request from the home base station for the requested data at step S560. If a cooperation request has been received, the local base station transmits the requested data to the home base station at step S565. The data transmitted to the home base station is used for cooperative caching afterward.

Figure 6:
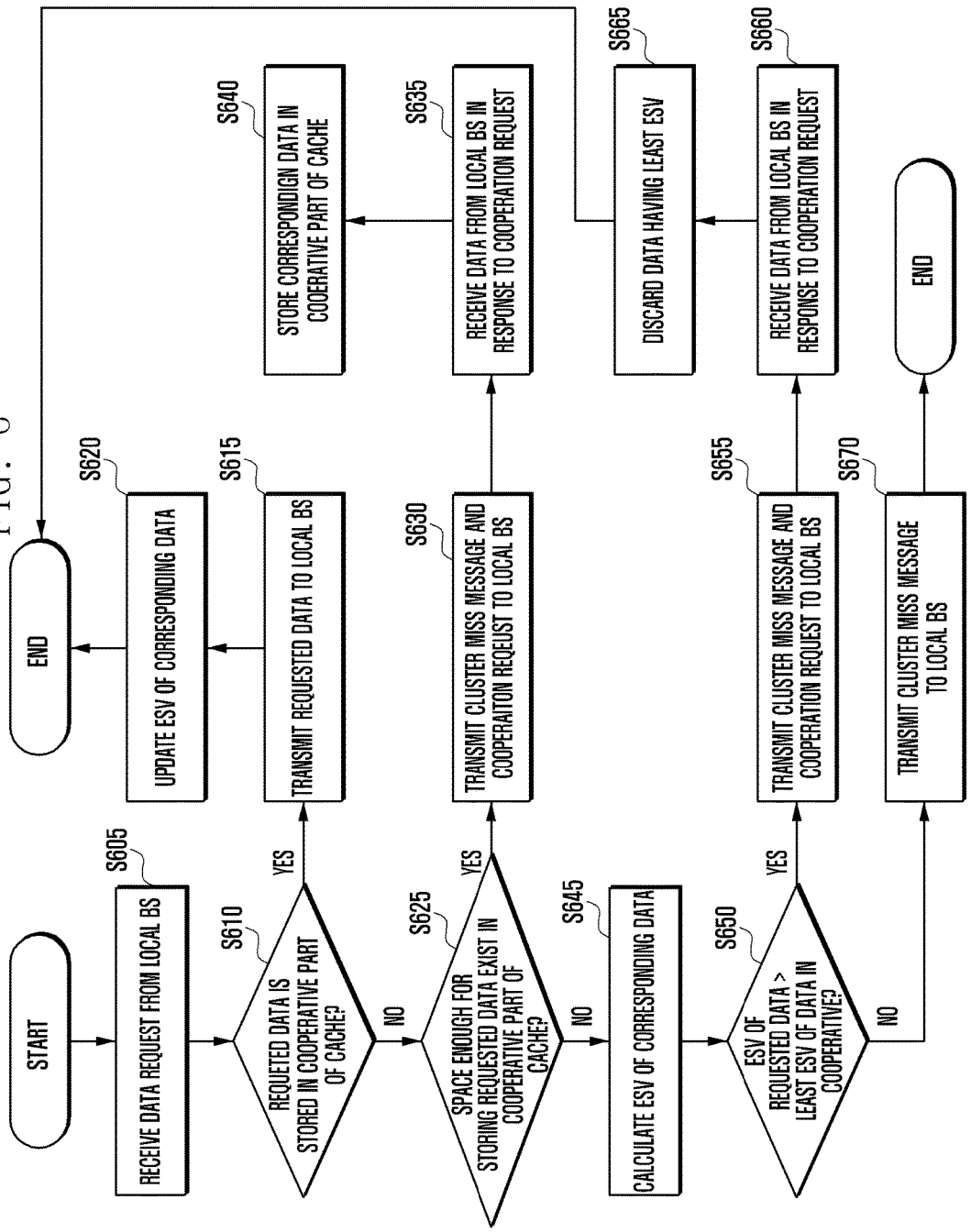
FIG. 6 is a flowchart illustrating an operation procedure of a home base station in a cooperative caching method according to an embodiment of the present invention.

FIG. 6 is a flowchart illustrating an operation procedure of a home base station in a cooperative caching method according to an embodiment of the present invention.

Referring to FIG. 6, the home base station first receives a request for a certain data from a local base station, at step S605. Upon receiving the request, the home base station determines whether the requested data is stored in the cooperative part of the cache of the home base station, at step S610. If the requested data is stored in the cooperative part, the home base station transmits the requested data to the local base station, at step S615. Next, the home base station updates an ESV of the requested data, at step S620. The ESV is defined as a value of gain expected through cooperation for the corresponding data.

If the requested data is not stored in the home base station at step S610, the home base station determines whether there is the enough space to store the requested data in the cooperative part of it's the cache of the home base station, at step S625. If there is enough space to store the requested data, the home base station transmits a cooperation request message to the local base station along with a cluster miss message, at step S630. The home base station receives the requested data in response to the cooperation request message at step S635 and stores the data in the cooperative part of the cache of the home base station, at step S640.

Otherwise, if there is not enough space to store the requested data, at step S625, the home base station calculates the ESV of the requested data, at step S645. Next, the home base station compares the calculated ESV with the least ESV of the data stored in the cooperative part of the cache of the home base station, at step S650.

If the calculated ESV is less than or equal to the lowest ESV of the data stored in the cooperative part of its cache, the cooperation for the requested data is not required, and therefore, the home base station transmits only the cluster miss message to the local base station, at step S670.

Otherwise, if the calculated value is greater than the least ESV of the data stored in the cooperative part of its cache, the cooperation for the requested data is required, and therefore, the home base station transmits a cooperation request message to the local base station along with the cluster miss message, at step S655. Next, the home base station receives the requested data from the local base station in response to the cooperation request message, at step S660. Upon receiving the requested data, the home base station discards the data having the lowest ESV of the data from among the data stored in the cooperative part of the cache and stores the received data in the cooperative part of the cache, at step S640.

For cooperation, each base station maintains a key, ESV (m, nd, c, c', pd_c), and address of the local base station that has requested for the corresponding key that corresponds to the data as their home base station.

Here, m denotes the number of base stations of a cluster, nd denotes the number of base stations requested for the data in the cooperative part of the base station, c denotes the cost required for acquiring the requested data from the external server (including the cost required for accessing the local base station), c' denotes the cost required for acquiring the requested data from a base station in the cluster (including the cost for local access and transferring the data to its home base station), and pd_c denotes the probability in which that corresponding data is requested at least one time to a base station of the cluster. In this method, the cost can be determined by taking notice of the situation such as the access delay and traffic amount for data movement.

The ESV of each data is determined by Equation (1) below with the aforementioned parameters. The ESV is defined as the sum of gains expected when at least one of the base stations that do not have the data requests the corresponding data.

$$\sum_{k=1}^{m-n_d-1} k \cdot (c-c') \cdot \binom{m-n_d-1}{k} \cdot p_{d\_c}^k \cdot (1-p_{d\_c})^{m-n_d-1-k} + c \cdot p_{d\_c}, \quad (1)$$

$$\text{for } 1 \leq n_d \leq m-1$$

In Equation (1), when certain data is stored in the cooperative part of the home base station, i) if at least one of the base stations (with the exception of the home base station) sends a request for the corresponding data, the request causes the intra-cluster cost c' instead of the cost c for acquiring the data from the server, resulting in the gain as much as c−c'. At this time, the saved cost c−c' increases the number of base stations requesting for the corresponding data, (i.e., k. ii) if only the home base station requests for the data, the cost for acquiring the data from the server (i.e., c), is saved.

The ESV of certain data that is stored for use in cooperation is calculated by adding the expected values acquired by multiplying the request probabilities with the saved costs in the cases (i.e., from the case where one of the base stations with the exception of the home base station requests for the data to the case where all of the base stations with the exception of the home base station requests for the data (k=1 to k=m−nd−1) and the case where only the home base station requests for the data). The ESV calculated in this way varies dynamically according to the probability in which the corresponding data is requested (pd_c) and the number of base stations having the corresponding data in the cluster.

In an example where the cluster is composed of three base stations (m=5), if the cost for acquiring the data from the server is 100 (c=100) and if the cost for acquiring the data from the home base station in the cluster is 1 (c'=1); the request probability of the data is 0.4 (pd_c=0.4) and the ESV of the corresponding data is 158.9 (ESV=158.5), when the number of base stations having the data in the cluster is 1 (nd=1) and 119.2, when the number of base stations having the data in the cluster is 2 (nd=2). In this way, as the number of base stations having the data in the cluster increases, the ESV decreases.

When the number of base stations having the corresponding data in the cluster is 2 (nd=2), if the request probability (pd_c) is 0.6, the ESV is 178.8. That is, the probability in which the data distributed scarcely in the cluster is stored for use in cooperation and the probability in which the data is to be retained long in the cache are high. Since the data having high popularity also has a greater request probability, the data also has the greater probability of being stored for use in cooperation and being retained for a long time in the cache.

Figure 7:
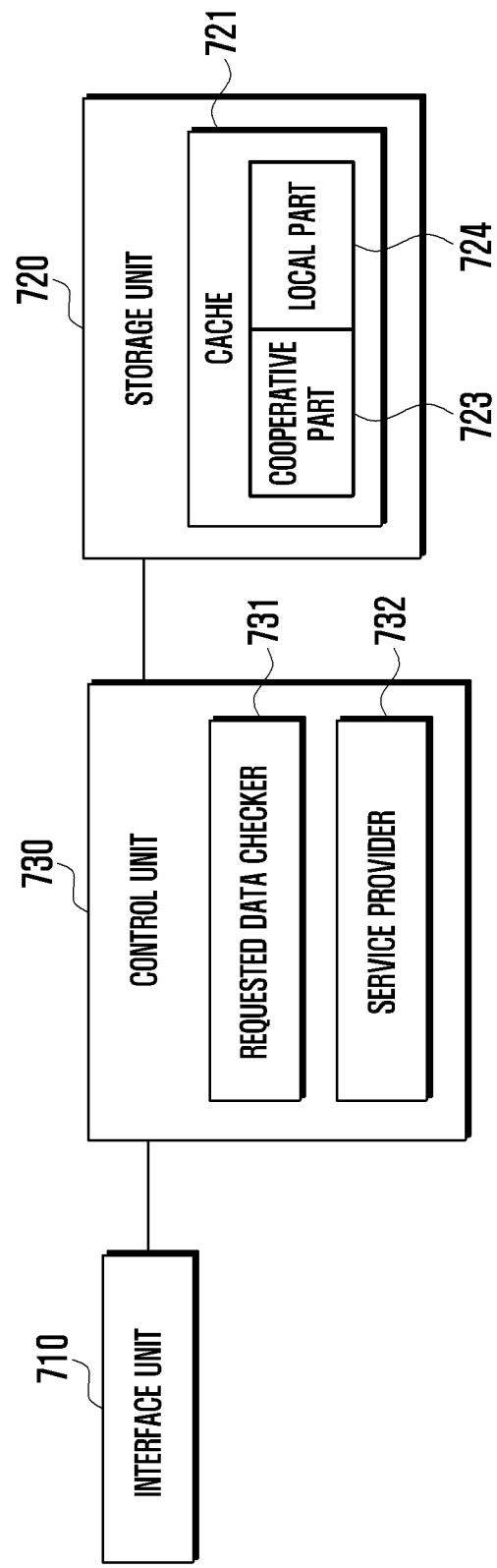
FIG. 7 is a block diagram illustrating a configuration of a local base station according to an embodiment of the present invention.

FIG. 7 is a block diagram illustrating a configuration of a local base station according to an embodiment of the present invention.

As shown in FIG. 7, a local base station according to an embodiment of the present invention includes an interface unit 710, a storage unit 720, and a control unit 730.

The interface unit 710 is responsible for wired and wireless communication with at least one node connected to the local base station. Here, the node can be any of a client to be served by the local base station, neighbor base stations constituting the cluster, and a server.

The storage unit 720 stores various programs associated with the operations of the local base station. According to an embodiment of the present invention, the storage unit 720 includes a cache 721 having a local part 724 for storing the data to be served to the clients connected to the local base station and a cooperative part 723 for storing the data supposed to be served to the nodes.

The local base station provides the connected clients with the data stored in the local part 724 of its cache 721 and operates as the home base station for specific data with the cooperative part 723 of the cache 721 for storing the specific data.

The control unit 730 controls signal flows among the function blocks for the operation of the local base station according to an embodiment of the present invention. Particularly, according to an embodiment of the present invention, the control unit 730 controls the local base station to perform cooperative caching with the home and local base stations. For this purpose, the control unit 730 includes a requested data checker 731 and a service provider 732.

If a data request is received from a client, the requested data checker 731 determines whether the requested data is stored in the cache. If the requested data is not stored in the cache, the requested data checker 731 requests the home base station (which is supposed to store the corresponding data) for the data.

The service provider 732 acquires the requested data from the home base station or the server, according to whether the home base station has the corresponding data to serve the acquired data to the client. If the home base station has the requested data, the service provider 723 receives the requested data from the home base station and serves the data to the client and stores the corresponding data in the local part of the cache.

The service provider 723 controls discarding of the oldest data from the local part of the cache and storage of the acquired data in the local part. If the home base station does not have the requested data, the service provider 732 controls acquiring of the requested data from the server, serving the acquired data to the client, and storage of the acquired data in the local part of the cache.

If the cooperation request for the data is received form the home base station, the service provider 732 controls transmission of the requested data to the home base station.

Figure 8:
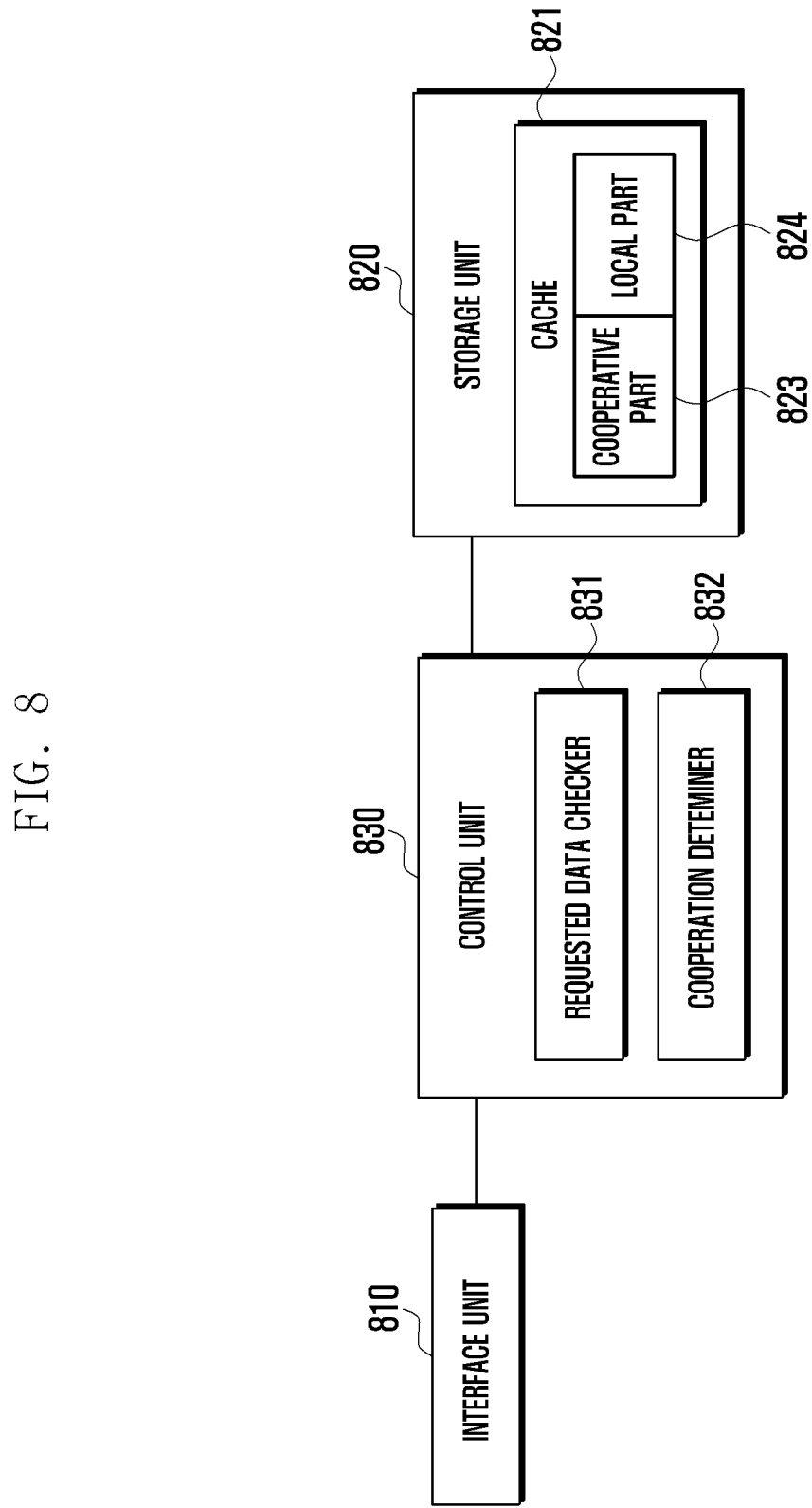
FIG. 8 is a block diagram illustrating a configuration of a home base station according to an embodiment of the present invention.

FIG. 8 is a block diagram illustrating a configuration of a home base station according to an embodiment of the present invention.

As shown in FIG. 8, the home base station includes an interface unit 810, a storage unit 820, and a control unit 830.

The interface unit 810 is responsible for wired and wireless communication with at least one node connected to the local base station. Here, the node can be any of a client to be served by the local base station, neighbor base stations constituting the cluster, and a server.

The storage unit 820 stores various programs associated with the operations of the home base station. According to an embodiment of the present invention, the storage unit 820 includes a cache 821 having a local part 824 for storing the data to be served to the clients connected to the home base station and a cooperative part 823 for storing the data to be served to the nodes.

The control unit 830 controls signal flows among the function blocks for the operation of the home base station according to an embodiment of the present invention. Particularly, according to an embodiment of the present invention, the control unit 830 controls the home base station to perform cooperative caching with other home and local base stations. For this purpose, the control unit 830 includes a requested data checker 831 and a cooperation determiner 832.

If a data request is received from a local base station, the requested data checker 831 determines whether the requested data is stored in the cache and sends the determination result to the cooperation determiner 832.

If the requested data is stored in the cache, the cooperation determiner 823 transmits the requested data to the local base station. Otherwise, if the requested data is not stored in the cache, the cooperation determiner 823 determines whether to cooperate with other entities for the requested data, according to whether there is a space enough for storing the requested data.

After transmitting the requested data, the cooperation determiner 832 controls updating of the expected saving value of the requested data. Here, the expected saving value is defined as the gain expected through cooperation for the requested data. The expected saving value can be according to Equation (1).

If there is enough space to store the requested data, the cooperation determiner 832 controls transmission of a cooperation request message to the local base station and storage of the requested data received from the local base station in the cooperative part of the cache. Otherwise, if there is not enough space to store the requested data, the cooperation determiner calculates the expected saving value of the requested data. The cooperation determiner 832 compares the expected saving value of the requested data with the least expected saving value of the data stored in the cooperative part and, if the expected saving value of the requested value is greater than the least expected saving value of the data stored in the cooperative part, the home base station transmits the cooperation request message to the local base station. The cooperative determiner 832 controls receipt of the requested data transmitted by the local base station and storage of the received data in the cooperative part.

Otherwise, if the expected saving value of the requested value is less than or equal to the least expected saving value of the data stored in the cooperative part, the cooperation determiner 832 stops cooperation for the requested data.

Although the above description of embodiments of the present invention is directed to cases where the control unit of the local or home base station includes separate functions blocks, which operate different functions, embodiments of the present invention are not limited to such a configuration. For example, the cooperation unit 823 can be integrated into the control unit 830 such that the control unit 830 performs the functions of the cooperation unit 823.

As described above, the cooperative caching method and apparatus of the present invention adopts a Distributed Hash Table (DHT) so as to facilitate controlling the data for cooperation and improve a load-balancing effect. Accordingly, the cooperative caching method and apparatus of embodiments of the present invention are capable of using the caches of the base stations cooperatively other than independently, so as to increase the cache hit rate and reduce outbound traffic amount to the external network, resulting in a reduction of data acquisition costs.

Also, the cooperative caching methods and apparatuses of embodiments of the present invention divide the cache of each base station into a cooperative part and a local part to increase the Expected Saving Value (ESV) of the data stored in the cooperative part, resulting in improvement of the cooperative effect.

Furthermore, the cooperative caching methods and apparatuses of embodiments of the present invention are capable of storing data in the local base stations redundantly, such that the data having the greatest popularity is served by the local base station immediately, thereby reducing data access time and traffic load in the cluster especially when the internal traffic increases abruptly.

Although embodiments of the present invention are described in detail hereinabove with specific terminology, this terminology is used for the purpose of describing particular embodiments only, and is not intended to limit the invention. While particular embodiments of the present invention have been illustrated and described, it would be obvious to those skilled in the art that various other changes and modifications can be made without departing from the spirit and scope of the invention as defined by the appended claims and their equivalents.

What is claimed is:

1. A cooperative caching method by a local base station in a mobile communication system, the method comprising:
   determining, by the local base station, if a request for data is received from a client, whether the data is stored in a cache of the local base station;
   transmitting, by the local base station, a message for requesting for the data, if the requested data is not stored in the cache, to a predetermined home base station to store the requested data;
   receiving, by the local base station the data from the predetermined home base station if the data is stored in the predetermined home base station and from a server if the data is not stored in the predetermined the home base station;
   transmitting, by the local base station the data to the client; and
   transmitting, by the local base station, the data to the predetermined home base station to store the requested data.

2. The method of claim 1, wherein transmitting the data to the client comprises:
   transmitting, to the client, if the data is stored in the predetermined home base station, the data received from the predetermined home base station; and
   storing the data in a local part of the cache.

3. The method of claim 2, wherein storing the data in the local part of the cache comprises:
   discarding an oldest data from the local part; and
   storing the data in the local part.

4. The method of claim 1, wherein transmitting the data to the client comprises:
   receiving, if the data is not stored in the predetermined home base station, the data from the server;
   transmitting, to the client, the data received from the server; and
   storing the data in a local part of the cache.

5. The method of claim 1, wherein transmitting the data to the predetermined home base station, comprises:
   transmitting, if a cooperation request is received from the predetermined home base station, the data to the home base station.

6. A local base station for performing cooperative caching in a mobile communication system, the local base station comprising:
   an interface unit for communicating with at least one node connected to the local base station;
   a storage unit that includes a cache including a local part for storing data to be served to clients connected to the local base station and a cooperative part for storing data predetermined to be stored in the local base station and provided to the nodes; and
   a control unit for determining, if a request for a data is received from a client, whether the data is stored in a cache of the local base station, transmitting a message for requesting the data, if the requested data is not stored in the cache, to a predetermined home base station to store the requested data, receiving the data from the predetermined home base station if the data is stored in the predetermined home base station, and from a server if the data is not stored in the predetermined home base station, transmitting the data to the client, and transmitting the data to the predetermined home base station to store the requested data.

7. The local base station of claim 6, wherein the control unit controls transmitting, to the client, if the data is stored in the predetermined home base station, the data received from the predetermined home base station and storing the data in the local part of the cache.

8. The local base station of claim 7, wherein the control unit controls discarding of an oldest data from the local part and storing the data in the local part.

9. The local base station of claim 6, wherein the control unit controls receiving, if the data is not stored in the predetermined home base station, the data from the server, transmitting, to the client, the data received from the server, and storing the data in the local part of the cache.

10. The local base station of claim 6, wherein the control unit controls transmitting, if a cooperation request is received from the predetermined home base station, the data to the home base station.

* * * * *